3,684,743
COMBUSTION CHAMBER COATINGS OF DIESEL ENGINES WITH VOLUMETRIC-FILM OR FILM MIXING
Nikolai Stepanovich Morotsky, ulitsa Kommuny 88, kv. 51; Natalia Lvovna Emelianenko, ulitsa Turistov 106, kv. 39; and Ramil Iskandarovich Shagabutdinov, Prospekt Lenina 20, kv. 76, all of Chelyabinsk, U.S.S.R.
No Drawing. Filed Aug. 18, 1970, Ser. No. 64,820
Int. Cl. B01j 11/06
U.S. Cl. 252—458
2 Claims

ABSTRACT OF THE DISCLOSURE

The invention relates to the combustion chamber coatings of the internal combustion piston engines.

According to the invention, the coating of the diesel combustion chamber is characterized in that an adhesion molybdenum backing applied to the combustion chamber by plasmic spraying is coated with a catalytic aluminosilicate layer consisting of 60–90% silicon oxide and 40–10% aluminum oxide which speeds up the decomposition of the source molecules of fuel within the preflame period and reduces the quantity of unsaturated compounds in the liquid products of exhaust.

This coating is intended mainly for use in the diesels with volumetric-film or film mixing.

---

The present invention relates to the internal combustion piston engines and more specifically it relates to the combustion chamber coatings of diesel engines with volumetric-film or film mixing.

The present invention may prove useful in all the diesels with volumetric-film or film mixing including those acting on the principle devised by Meuyer.

Known in the art are the following combustion chamber coatings of diesel engines with volumetric-film or film mixing:

Heat-resistant coatings consisting of aluminium and zirconium oxides on abrasion, Nichrome and molybdenum backings. These coatings are intended to reduce the thermal stresses of the pistons or to control the temperature in the combustion chamber of an engine with film mixing (patent USA No. 2,832, Cl. 128—32);

Catalytic oxidizing coatings consisting of cerium oxide and other carriers of oxygen of a general structure $MeO_2$, intended to improve the completeness of combustion and to control the formation of carbon deposits (see "Machine Design," 1960, vol. 32, No. 10, p. 22).

The above coatings fail to eliminate the disadvantages existing in the process of fuel combustion in engines so that their use is, as a rule, a compromise measure. Thus, for example, the use of heat-resistant coatings reduces the thermal stresses of the piston rings but increases the temperature of residual gases and heating of the air charge which calls for finding optimum relations between the extension of the guarantee service life of the engine and a reduction in its economy.

The use of oxidizing catalytic coatings in the diesels with film and volumetric-film mixing improves the completeness of fuel combustion only in a certain range of loads; below this range such coatings intensify low-temperature gumming of the exhaust line which results in jamming of the exhaust valves. The low-temperature gumming of the exhaust line is caused by liquid-phase thermal dissociation (cracking) of the nonevaporated hydrocarbons of fuel which results in the formation of light unsaturated compounds having an affinity to polymerization on the surfaces of the diesel exhaust line. This polymerization is initiated by the free radicals formed in the process of liquid-phase oxidation of the same compounds. A decrease in the thermal level of the oxidizing reactions obtained by means of the oxidizing catalysts intensifies the low-temperature gumming.

An object of the present invention resides in eliminating the aforesaid disadvantages.

The main object of the invention is to provide a coating of the diesel combustion chamber with volumetric-film or film mixing which would prevent low-temperature gumming of the exhaust line and speed up the preparation of the fuel for ignition with a virtually unchanging state of the diesel combustion chamber.

According to the invention, this is achieved by applying by plasmic spraying a catalytic aluminosilicate layer to an adhesion molybdenum backing, said catalytic layer accelerating the decomposition of base molecules of fuel in the preflame period, reducing the quantity of unsaturated compounds in the liquid products of exhaust, and consisting of 60–90% silicon oxide and 40–10% aluminium oxide.

It is most practicable that the thickness of each coating layer should range from 0.07 to 0.08 mm.

The claimed coating ensures successful achievement of the objects of the present invention.

Let us consider one form of coating of the diesel combustion chamber with volumetric film mixing that has been tested on several tractors in the course of 18,380 hours, 4000 hours per tractor.

The surface of the combustion chamber is degreased with gasoline and sand-blasted after which it is coated with a layer of molybdenum by flame spraying. Then the molydbenum layer is coated by plasmic spraying with a catalytic aluminosilicate layer consisting of 40% aluminium oxide and 60% silicon oxide, the size of the particles of these oxides varying from 25 to 100 microns. The thickness of each layer varies from 0.07 to 0.08 mm. The molybdenum layer is intended to improve adhesion of the combustion chamber material to the catalytic aluminosilicate layer. A high heat conductivity of molybdenum excludes the possibility of braking of the heat fluxes in this backing. The catalytic effect of aluminosilicates, well known in the oil-refining industry, causes replacement of the majority of the unsaturated products of liquid-phase fuel cracking by saturated compounds which are incapable of polymerization, the remaining unsaturated products of cracking are, apparently, subjected to catalytic isomerization which, during further polymerization, leads to the formation of low-viscosity compounds whose molecular weight does not exceed the average molecular weight of the source fuel.

The low-temperature catalytic activity of the aluminosilicate coating which, as it is known, is intended to stimulate polymerization of the unsaturated compounds, is suppressed by the formation of the coating consisting of crystalline oxides (quarts, marshalite and corundum) at plasma temperatures up to 16,000° C.

A diesel engine with a catalytic aluminosilicate coating of its combustion chamber is not subjected to low-temperature gumming of the exhaust line at the coolant temperatures from +35 to —40° C. up to —45° C. of the ambient air. Alongside with the basic antigumming effect, the aluminosilicate coating speeds up the chemical preparation of fuel for ignition which reduces the optimum values of the fuel delivery angle at low and medium engine loads by 2 or 2.5 crank-shaft degrees and the engine acquires a noticeable tendency to the increased economy. A simultaneous reduction of the thermal level of the reactions involving the decomposition of the fuel molecules facilitates considerably the starting of the diesel engine in cold weather. The use of aluminosilicate coatings of the diesel combustion chambers reduces the minimum temperature of the ambient air (approximately by 10° C.) at which the diesel can be started.

The gum deposits formed at low engine loads are decomposed on the surface of the aluminosilicate coating; this embrittles said deposits which are subsequently removed easily when the engine power is increased.

The amount of carbon deposits can also be decreased by cyclic regeneration of the coating surface which is accomplished by raising the temperature of the air charge on the compression stroke.

The ratio of the components of the catalytic layer adopted in the above described example has been worked out in order to bring the thermal coefficient of expansion of this layer closer to the same coefficient of the adhesion backing. However, practical experience has shown that this ratio can be changed by increasing the proportion of silicon to 90% with a corresponding reduction of the aluminium oxide content down to 10%.

What we claim is:

1. A combustion chamber coating of the diesel engines with volumetric-film and film mixing consisting of an adhesion molybdenum layer applied to the surface of the diesel combustion chamber and a catalytic aluminosilicate layer applied by plasmic spraying to said molybdenum layer, said catalytic layer consisting of 60–90% silicon oxide and 40–10% aluminium oxide; said layer speeds up the decomposition of the source molecules of fuel during the preflame period and reduces the quantity of unsaturated compounds in the liquid products of exhaust.

2. A coating of the diesel combustion chamber as claimed in claim 1 wherein the thickness of the adhesion molybdenum and catalytic aluminosilicate layers are equal and are, each, 0.07 to 0.08 mm.

References Cited

UNITED STATES PATENTS

| | | | |
|---|---|---|---|
| 2,833,264 | 5/1958 | Dailey et al. | 123—191 A |
| 2,978,360 | 4/1961 | Bradstreet et al. | 123—191 A |
| 3,264,226 | 8/1966 | Johnson | 252—458 X |

CARL F. DEES, Primary Examiner

U.S. Cl. X.R.

123—191 A